United States Patent
Massa et al.

(10) Patent No.: US 7,325,471 B2
(45) Date of Patent: Feb. 5, 2008

(54) TOOLHOLDER AND CUTTING INSERT FOR A TOOLHOLDER ASSEMBLY

(75) Inventors: Ted R. Massa, Latrobe, PA (US); David R. Siddle, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/935,480

(22) Filed: Sep. 7, 2004

(65) Prior Publication Data

US 2006/0051167 A1   Mar. 9, 2006

(51) Int. Cl.
*B23B 27/16* (2006.01)
(52) U.S. Cl. .................... 82/1.11; 407/33; 407/42; 407/48; 407/103; 279/8
(58) Field of Classification Search .......... 407/33, 407/42, 48, 47, 53, 54, 64, 103, 113; 279/8; 82/1.11

See application file for complete search history.

(56) References Cited

U.S. PATENT DOCUMENTS

| | | | | |
|---|---|---|---|---|
| 1,724,005 A | * | 8/1929 | Christensen | 408/201 |
| 2,087,231 A | * | 7/1937 | Christman | 408/229 |
| 2,153,236 A | * | 4/1939 | Christman | 407/33 |
| 2,164,571 A | * | 7/1939 | Christman | 408/227 |
| 2,164,573 A | * | 7/1939 | Christman | 408/227 |
| 2,206,770 A | | 7/1940 | Drummond | |
| 2,383,688 A | * | 8/1945 | Seiter | 279/8 |
| 2,551,167 A | | 5/1951 | Rolland | |
| 2,974,965 A | * | 3/1961 | Welles, Jr. | 279/83 |
| 3,320,833 A | * | 5/1967 | Andreasson | 408/57 |
| RE26,637 E | | 7/1969 | Vaughn | |
| 3,629,919 A | * | 12/1971 | Trevarrow, Jr. | 407/103 |
| 4,178,818 A | | 12/1979 | Yascheritsyn et al. | |
| 4,461,602 A | * | 7/1984 | Zettl | 407/40 |
| 4,477,211 A | | 10/1984 | Briese | |
| 4,824,300 A | | 4/1989 | Pomikacsek | |
| 4,934,883 A | * | 6/1990 | Andersson et al. | 409/234 |
| 5,218,893 A | * | 6/1993 | Shikata | 82/1.11 |
| 5,431,514 A | | 7/1995 | Saito et al. | |
| 5,598,751 A | * | 2/1997 | Ochayon et al. | 76/108.6 |
| 5,607,263 A | * | 3/1997 | Nespeta et al. | 407/61 |
| 5,674,032 A | | 10/1997 | Slocum et al. | |
| 5,810,518 A | * | 9/1998 | Wiman et al. | 407/102 |
| 5,899,642 A | * | 5/1999 | Berglow et al. | 407/40 |
| 5,924,826 A | * | 7/1999 | Bystrom et al. | 407/103 |
| 5,975,811 A | * | 11/1999 | Briese | 407/40 |
| 6,073,524 A | | 6/2000 | Weiss et al. | |

(Continued)

OTHER PUBLICATIONS

Lei, S. et al., "High-speed machining of titanium alloys using the driven rotary tool," International Journal of Machine Tools & Manufacture 42, May 2002, pp. 653-661.

(Continued)

*Primary Examiner*—Monica Carter
*Assistant Examiner*—Sara Addisu
(74) *Attorney, Agent, or Firm*—Larry R. Meenan

(57) ABSTRACT

A toolholder and cutting insert for a toolholder assembly wherein the cutting insert has a tapered shank which provides a resilient interference fit with a tapered section of a bore extending within the toolholder. Additionally, a rearwardly facing face on the cutting insert abuts with a forwardly facing surface on the toolholder to properly locate the cutting insert within the toolholder.

33 Claims, 6 Drawing Sheets

U.S. PATENT DOCUMENTS

| | | | |
|---|---|---|---|
| 6,146,060 A * | 11/2000 | Rydberg et al. | 407/40 |
| 6,146,061 A * | 11/2000 | Larsson | 407/103 |
| 6,276,879 B1 * | 8/2001 | Hecht | 409/234 |
| 6,312,199 B1 * | 11/2001 | Sjoden et al. | 407/11 |
| 6,394,466 B1 * | 5/2002 | Matsumoto et al. | 279/103 |
| 6,494,648 B2 * | 12/2002 | Harpaz | 407/30 |
| 6,502,487 B2 | 1/2003 | Yamazaki et al. | |
| 6,503,027 B2 * | 1/2003 | Men | 407/33 |
| 6,626,614 B2 * | 9/2003 | Nakamura | 408/59 |
| 6,880,437 B2 * | 4/2005 | Sjoo et al. | 82/158 |
| 6,896,450 B2 * | 5/2005 | Rothenstein | 408/59 |
| 6,902,355 B2 * | 6/2005 | Kress et al. | 408/59 |
| 7,112,021 B2 * | 9/2006 | Pantzar | 409/234 |
| 7,131,802 B2 * | 11/2006 | Pantzar | 409/234 |
| 2001/0009636 A1 * | 7/2001 | Men | 407/33 |
| 2003/0210963 A1 * | 11/2003 | Kakai et al. | 408/231 |
| 2004/0067112 A1 * | 4/2004 | Blucher et al. | 407/103 |
| 2004/0265074 A1 * | 12/2004 | Hessman et al. | 407/113 |
| 2005/0047885 A1 * | 3/2005 | Hyatt et al. | 409/132 |

OTHER PUBLICATIONS

Shaw, M. et al., "The Rotary Cutting Tool," Cambridge, Mass., Transactions of the ASME, Aug. 1952, pp. 1065-1076.

Venuvinod, P. et al., "Some Investigations into Machining with Driven Rotary Tools," Journal of Engineering for Industry, Nov. 1981, vol. 103, pp. 469-477.

Amarego, E. et al., "Fundamental Studies of Driven And Self-Propelled Rotary Tool Cutting Processes—I. Theoretical Investigation," Int. J. Mach. Tools Manufact. vol. 34, No. 6, pp. 785-801, 1994.

Amarego, E. et al., "Predictive Cutting Model for Forces and Power in Self-Propelled Rotary Tool Turning Operations," The University of Melbourne, Parkville, Victoria, Australia, Recd. on Jan. 9, 1997, pp. 19-24.

Chen, P. et al., "Characteristics of Self-Propelled Rotary Tools in Machining High-Performance Materials," Int. J. Japan Soc. Prec. Eng., vol. 25, No. 4 (Dec. 1991), pp. 267-272.

Wang, Z. et al., "Evaluation of a Self-Propelled Rotary Tool in the Machining of Aerospace Materials," Tribology Transactions, vol. 41 (1998), 2, pp. 289-295.

Nakajima, T. et al., "Synthesis of High Crystalline Carbon-Nitrogen Layered Compounds by CVD Using Nickel and Cobalt Catalysts," PII: S0008-6223(96)00143-1, Carbon vol. 35, No. 2, pp. 203-208, 1997.

* cited by examiner

TOOLHOLDER AND CUTTING INSERT FOR A TOOLHOLDER ASSEMBLY

BACKGROUND OF THE INVENTION

1. Field of the Invention

The invention is directed to a metalworking operation and more particularly to a toolholder and a mating cutting insert. The subject invention is also directed to a method of assembling the toolholder and mating cutting insert to form a toolholder assembly.

2. Description of Related Art

During a metalworking operation, a cutting insert is typically mounted upon a toolholder which secures the cutting insert as it is urged against a workpiece. Typically, the cutting insert fits into a shaped pocket within the toolholder and is held within the pocket by either a hold-down screw or a clamp. However, when the cutting insert is held within a pocket, it is important to provide clearance for the cutting edge of the insert within the pocket so that it does not become damaged, and furthermore, it is important to machine the pocket so that the cutting edge of the insert in contact with the workpiece is properly located.

A toolholder and cutting insert for a toolholder assembly are needed whereby the cutting insert may be accurately positioned within the toolholder while at the same time secured within the toolholder in a relatively simple fashion.

SUMMARY OF THE INVENTION

One embodiment of the subject invention is directed to a toolholder adapted to accept a cutting insert having a tapered shank and a rearwardly facing face thereon. The toolholder has a toolholder body, a bore extending rearwardly therein and having a central axis extending therethrough, and a forwardly facing surface extending about the bore for abutment with the rearwardly facing face of the insert. The bore has a tapered section dimensioned to provide a resilient interference fit with the shank when the forwardly facing surface is in abutment with the rearwardly facing face and wherein the tapered section narrows as the bore extends rearwardly.

A second embodiment of the invention is directed to a cutting insert adapted to be mounted within a toolholder having a bore extending rearwardly therein and a forwardly facing surface thereon. The insert comprises a cutting insert body having a forward end with a cutting edge thereupon, a shank receivable in the bore and extending rearwardly from the forward end, a central axis extending therethrough, and a rearwardly facing face between the forward end and the shank of the insert for abutment with the forwardly facing surface of the toolholder. The shank has a tapered section dimensioned to provide a resilient interference fit with the bore when the rearwardly facing face of the insert is in abutment with the forwardly facing surface of the toolholder.

A third embodiment of the subject invention is directed to a toolholder system comprising a toolholder and a cutting insert. The toolholder has a body with a toolholder bore extending rearwardly therein, a central axis extending therethrough and a forwardly facing surface extending about the bore. The cutting insert has a forward end with a cutting edge thereupon, an insert shank extending rearwardly from the forward end and having a central axis extending therethrough, and a rearwardly facing face. The forwardly facing surface of the toolholder is in contact with the rearwardly facing face of the insert. The toolholder bore has a tapered section and the shank has a slightly mismatched taper, wherein each is dimensioned to provide a resilient interference fit with each other when the forwardly facing surface of the toolholder is in abutment with the rearwardly facing face of the insert.

A fourth embodiment of the subject invention is directed to a method of releasably mounting a cutting insert onto a toolholder having a bore extending rearwardly therein and a forwardly facing surface extending about the bore. The insert has a forward end, a shank extending rearwardly therefrom, and a rearwardly facing face. The shank has a taper narrowing away from the forward end. The method comprises the steps of: a) inserting the insert into the toolholder bore, b) resiliently interference fitting the tapered shank into the toolholder bore, and c) abutting the rearwardly facing face of the insert against the forwardly facing surface of the toolholder.

BRIEF DESCRIPTION OF THE DRAWING(S)

DESCRIPTION OF THE PREFERRED EMBODIMENTS

Figure 1:
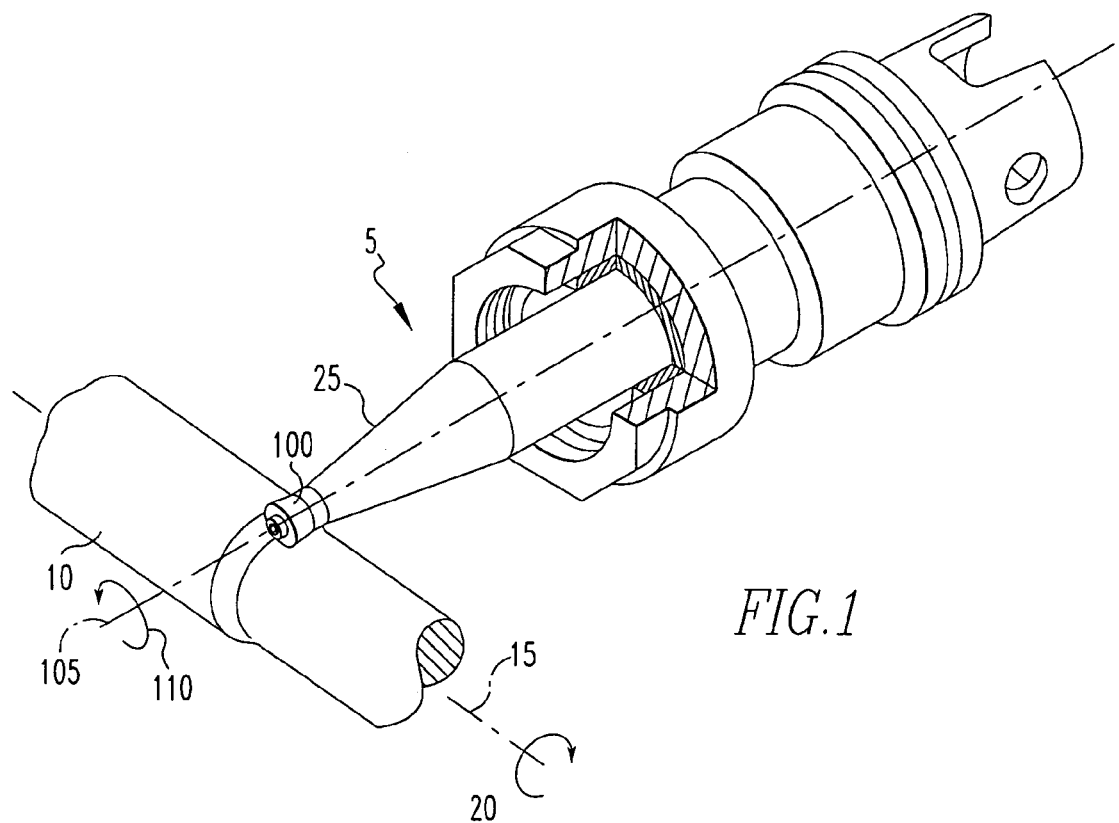
FIG. 1 is an isometric view of a toolholder assembly wherein a cutting insert is mounted within a toolholder.

FIG. 1 illustrates a workpiece 10 rotating about a centerline 15 in a direction indicated by arrow 20 when, for example, the workpiece 10 is mounted upon a lathe. A toolholder 25 has mounted thereupon a cutting insert 100 to form a toolholder assembly 5. The insert 100 mounted upon the toolholder 25 may be rotatable about a central axis 105 extending through the insert shank (115 in FIG. 2) in a direction indicated by arrow 110. The toolholder 25 may also be held securely without rotation. For purposes of the discussion herein, the toolholder assembly may be used in either stationary or rotating applications.

Additional details of the insert, toolholder and of the support member for holding the toolholder may be found in U.S. patent application Ser. No. 10/653,712 titled "Method and Assembly for Rotating a Cutting Insert With Fluid Impingement and the Insert Therein" filed Sep. 2, 2003, assigned to the assignee of the present application and hereby incorporated by reference.

Figure 3:
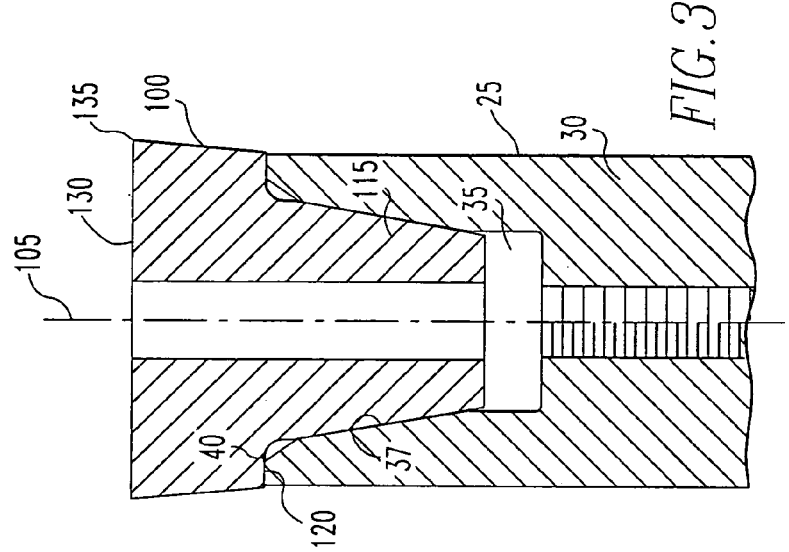
FIG. 3 is section view of the insert in FIG. 2 inserted within the toolholder.
Figure 2:
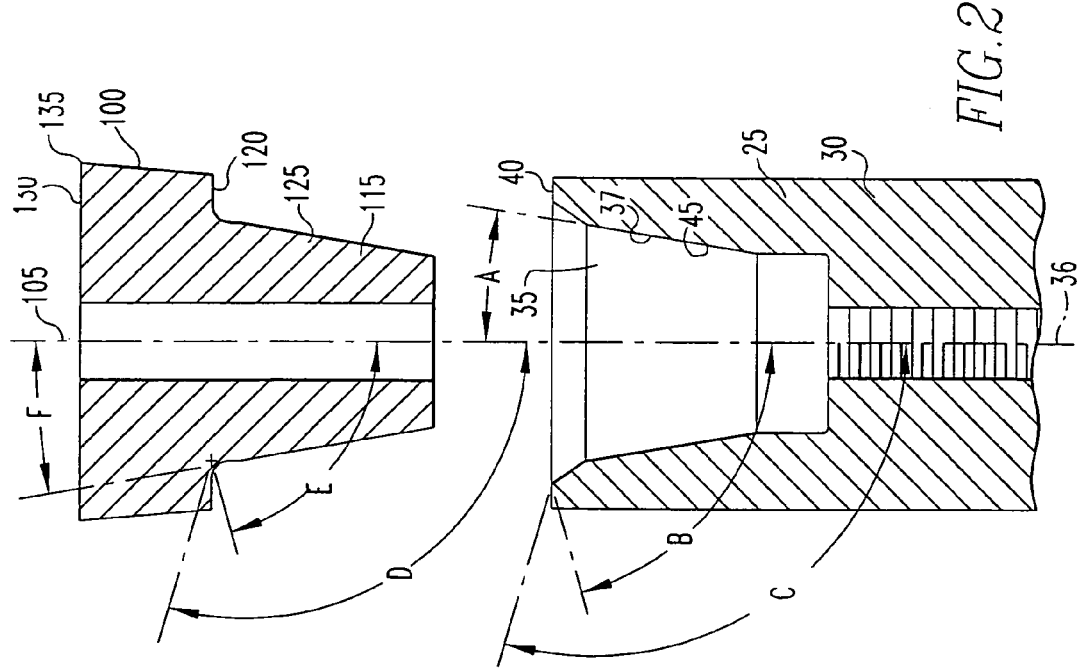
FIG. 2 is an exploded section view of an insert positioned relative to a toolholder.

FIGS. 2 and 3 illustrate cut-away views of the toolholder 25 and the cutting insert 100 in accordance with the subject invention. For purposes of identification, the direction from the bottom to the top of FIG. 2 will be referred to as forward and the opposite direction will be referred to as rearward. The toolholder 25 is adapted to accept the cutting insert 100 having a tapered shank 115 with a central axis 105 extending therethrough and a rearwardly facing face 120 thereon. The rearwardly facing face 120 is located between the forward end 130 of the insert body 125 and the shank 115 of the insert body 125. The toolholder 25 has a toolholder body 30 and a bore 35 extending rearwardly therein. The bore 35 has a central axis 36 extending therethrough. The toolholder body 30 furthermore has a forwardly facing surface 40 extending about the bore 35 for abutment with the rearwardly facing face 120 of the insert 100.

For purposes of discussion, even though the cutting insert shank 115 has a central axis 105 and the toolholder bore 35 has a central axis 36, when the insert 100 is mounted within the toolholder 25, these axes 105, 36 are co-axial. Therefore, throughout the application reference will be made to a single central axis 105 with the understanding that it applies to both axes 105, 36 when the insert 100 and toolholder 25 are assembled and when separated, the insert shank 115 and the toolholder bore 35 each have separate central axes 105, 36, respectively.

The bore 35 has a tapered section 45 to provide a resilient interference fit with the shank 115 when the forwardly facing surface 40 is in abutment with the rearwardly facing face 120. The tapered section 45 narrows as the bore 35 extends rearwardly. As illustrated in FIG. 3 with the insert 100 fully inserted within the bore 35 of the toolholder body 30 the rearwardly facing face 120 of the cutting insert 100 abuts the forwardly facing surface 40 of the toolholder body 30, while at the same time, the tapered shank 115 of the cutting insert body 125 contacts the wall 37 of the bore 35 to provide a resilient interference fit. As shown in FIG. 2, the wall 37 of the tapered section 45 of the bore 35 forms a taper angle A of between 5 degrees and 15 degrees, preferably about 10 degrees, with the central axis 36.

Additionally, the shank 115 of the cutting insert body 125 may form a taper angle F of between 5 and 15 degrees, preferably 10 degrees with the central axis 105 but the taper of the shank 115 and the taper section 45 of the toolholder body 30 are slightly mismatched in an amount ranging from approximately 0.5 degree to 3.0 degrees, preferably 0.5 degree.

In particular, the taper angle F of the shank 115 is greater than the taper angle A of the bore 35 so that the resilient interference fit will occur as close to the forwardly facing surface 40 of the toolholder body 30 as possible.

In a preferred embodiment, the difference between the taper angle A of the bore 35 and the taper angle F of the shank 115 as measured from the central axis 105 is 0.5 degree. The toolholder taper angle A is 9.5 degrees and the shank taper angle F is 10 degrees.

Additionally, the forwardly facing surface 40 of the toolholder body 30 is preferably perpendicular to the central axis 36 of the bore 35 or may form an angle with the central axis 36 of between 80 degrees and 100 degrees as illustrated by angles B and C in FIG. 2.

As mentioned, the cutting insert 100 has a cutting insert body 125 with a forward end 130 and a cutting edge 135 thereupon. The rearwardly facing face 120 of the cutting insert 100 is between the forward end 130 and the shank 115. Just as the forwardly facing surface 40 of the toolholder body 30 may have an angle within the range of 80 degrees and 100 degrees, so too may the rearwardly facing face 120 of the cutting insert body 125 form an angle D, E with the central axis 105 of between 80 degrees and 100 degrees. However, preferably, the rearwardly facing face 120 is perpendicular to the central axis 105 of the cutting insert body 125.

Figure 4:
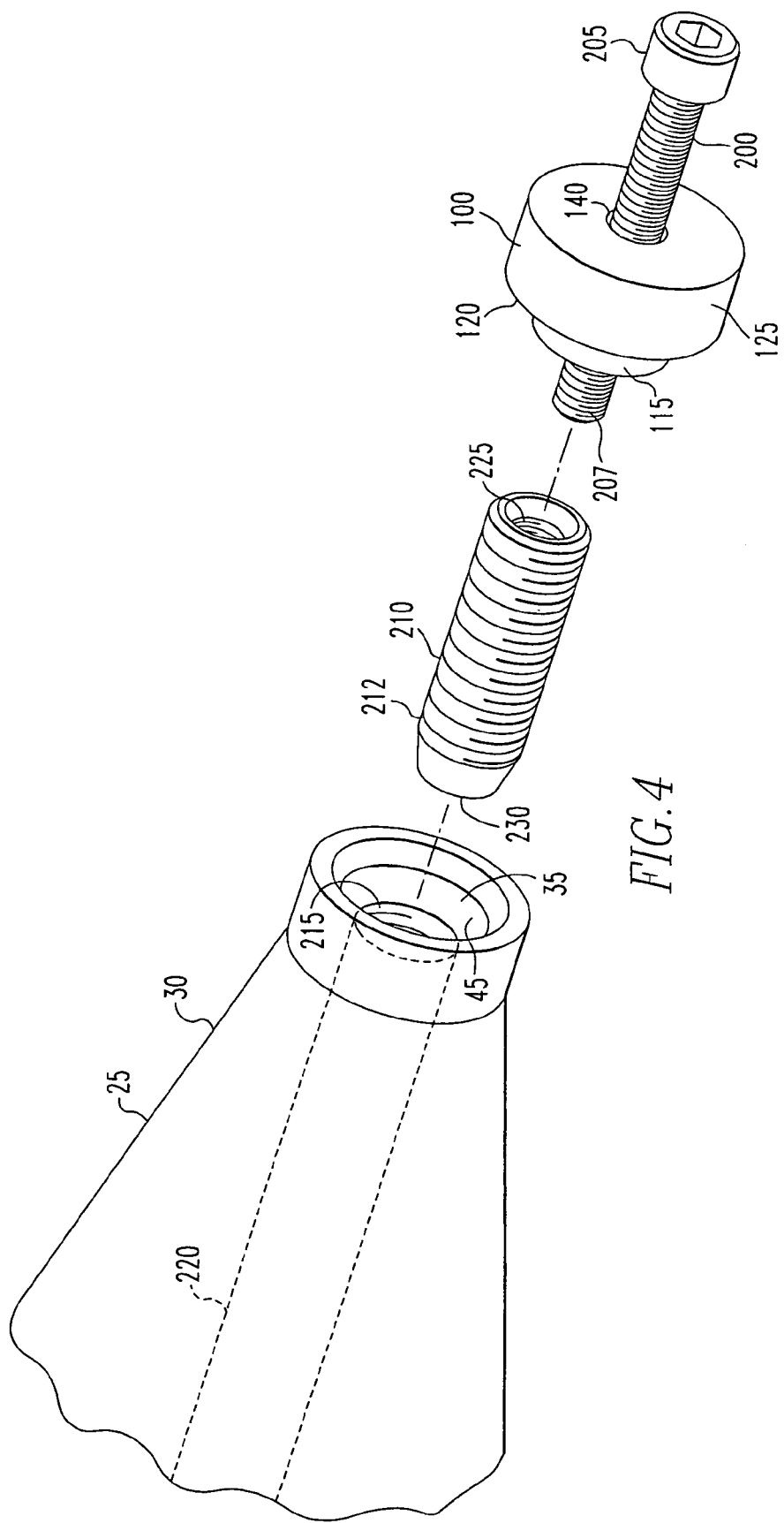
FIG. 4 is an isometric view showing details of one embodiment of the subject invention.

It is entirely possible for the cutting insert 100 to be mounted within the toolholder 25 and to remain therein based entirely upon the resilient interference fit between the tapered section 45 of the bore 35 and the tapered shank 115 of the cutting insert 100. However, as illustrated in FIG. 4 it is also possible to secure the cutting insert 100 within the toolholder 25 with the aid of a hold-down bolt 200. The hold-down bolt 200 extends through a passageway 140 within the cutting insert body 125. The head 205 of the hold-down bolt 200 is larger than the passageway 140 of the cutting insert body 125 such that when the hold-down bolt 200 is secured within the toolholder body 30, the cutting insert body 125 is securely held therein. In particular, the hold-down bolt 200 has a diameter smaller than that of the passageway 140 and has threads 207. A knockout screw 210 has threads 212 that are threadingly engaged with mating threads 215 within the passageway 220 extending through the toolholder body 30. The threads 207 of the hold-down bolt 200 are then threadably engaged with internal threads 225 within the knockout screw 210 so that the hold-down bolt 200 now retains the cutting insert body 125 within the bore 35 of the toolholder body 30 such that the rearwardly facing face 120 of the cutting insert body 125 abuts the forwardly facing surface 40 of the toolholder body 30 and furthermore the tapered shank 115 of the cutting insert body 125 provides a resilient interference fit with the tapered section 45 of the toolholder bore 35.

The knockout screw 210 not only assists in retaining the cutting insert 100 within the toolholder 25, but, furthermore, assists with the removal of the cutting insert 100 from the toolholder 30. In particular, the passageway 220 extends through the length of the toolholder body 30 such that access to the passageway 220 is available at the other side of the toolholder body 30. The end 230 of the knockout screw 210 has an opening, such as a hex-shaped opening, to accept a mating tool so that the knockout screw 210 may be rotated to press against and to expel the insert 100 from the toolholder 25. This is especially important since the tapered section 45 of the toolholder bore 35 and the tapered shank 115 of the cutting insert 100 have a resilient interference fit with one another.

The cutting insert body 125 may be made of a relatively rigid material such as a cemented tungsten carbide, a silicon nitride-based ceramic, or a sialon-based ceramic and the resilient interference fit between the shank 115 and the tapered section 45 of the toolholder bore 35 is made possible primarily through the expansion of the toolholder body 30 which typically would be made of steel (e.g., H13 tool steel).

In an actual embodiment of the toolholder assembly, using as a reference FIG. 2 and FIG. 3, the insert body 125 has a circular cutting edge 135 and an overall diameter of 1.000 inch. The taper major diameter is 0.707 inch for the toolholder tapered section 45 and the taper major diameter for the tapered shank 115 of the cutting insert body 125 is 0.709 inch. This 0.002 inch diameter differential, combined with the nominal 10 degree taper angle, produces a "standoff" between the rearwardly facing face 120 of the insert body 125 and the forwardly facing face 40 of the toolholder body 25 of 0.0056 inch. Using these dimensions results in an average hoop strain in the forward end of the toolholder tapered section 45 of approximately 0.0028 inch per inch when the rearwardly facing face 120 of the insert body 125 and forwardly facing surface 40 of the toolholder body 30 are in full abutment. This strain is sufficiently below the yield strain of the toolholder material, but adequate to maintain interference during operation, when differential temperatures and expansions may exist. In this embodiment the toolholder is made of H13 tool steel having an $R_C$ hardness of 45 and a cutting insert made of KYON® 1540 material, which is a sialon-based ceramic material.

It should be readily apparent to those of ordinary skill that these values have been selected for one toolholder and insert size. In differing sizes or styles of toolholders and/or inserts or of different materials for the toolholder and/or insert, values outside of these ranges may be appropriate to achieve equivalent results.

The design of the toolholder assembly in accordance with the subject invention may be used to accommodate a large range of insert sizes. However, for smaller insert sizes (i.e., ½ inch I.C.), to avoid creating excessive tensile stress in the region of the forwardly facing surface 40 of the toolholder body 30, it is possible to reduce the interference fit such that there still is a resilient interference fit but the stresses created by it are lessened. Under such circumstances it might be desirable to restrain rotation of the insert body 125 within the bore 35 with the use of positive stops.

Figure 5:
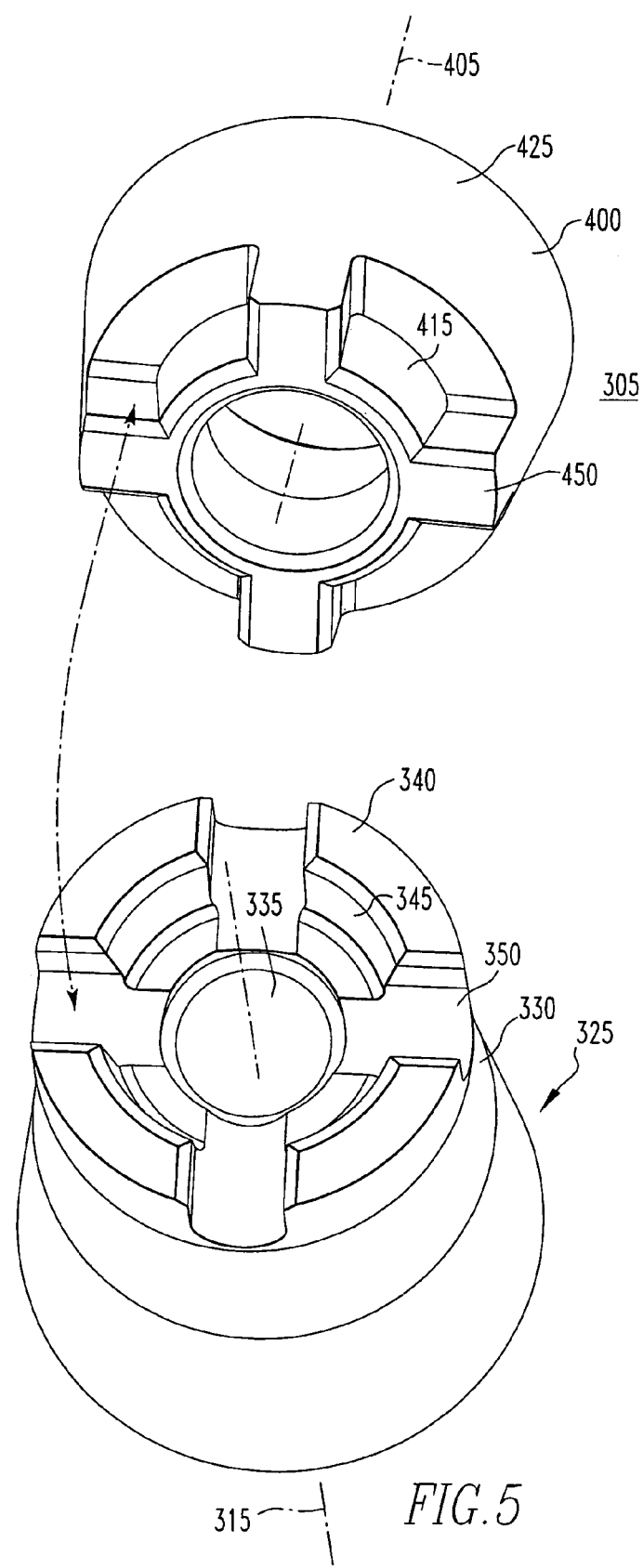
FIG. 5 is an isometric view of a second embodiment of a toolholder and cutting insert.
Figure 6:
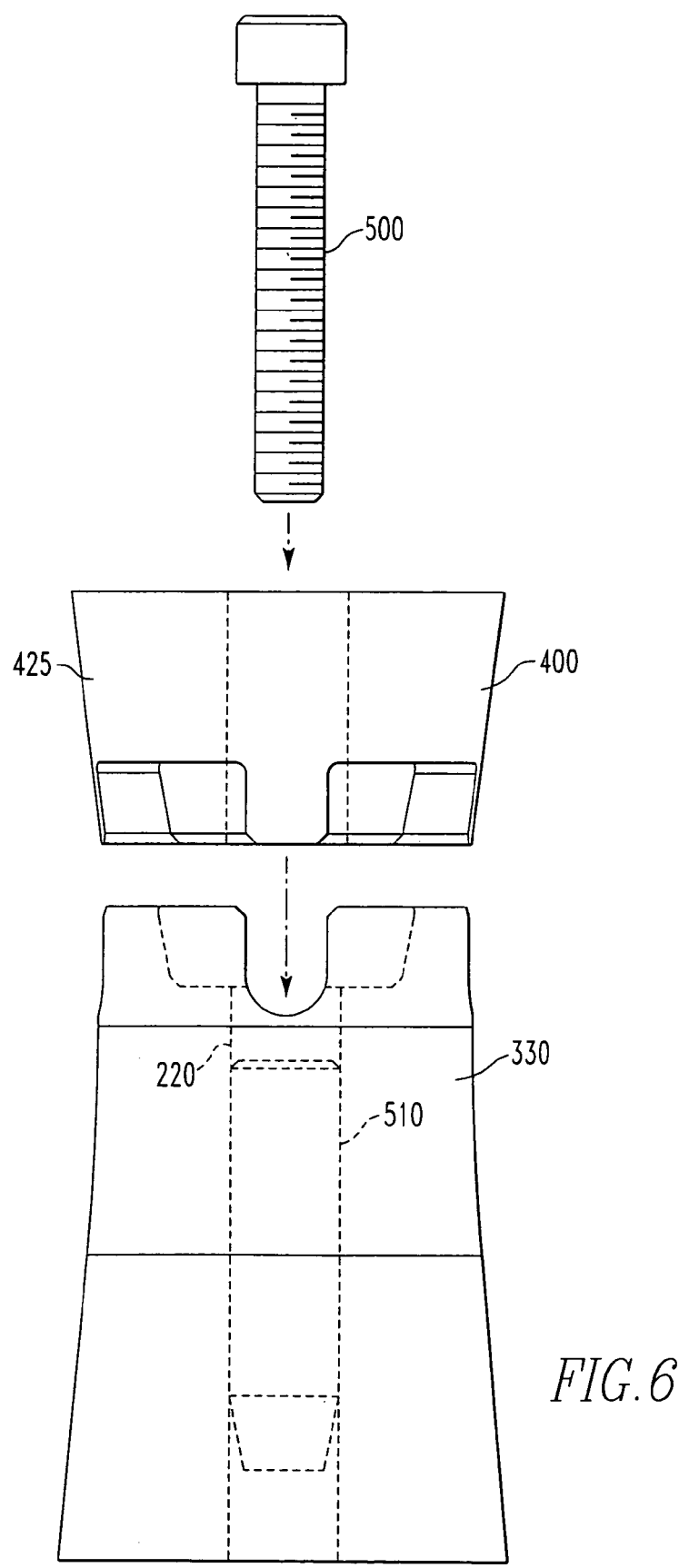
FIG. 6 is a side view of the toolholder assembly illustrated in FIG. 5.

Directing attention to FIGS. 5 and 6, a toolholder assembly 305 is comprised of a toolholder 325 having a body 330 and a cutting insert 400 having a cutting insert body 425. The toolholder body 30 previously described is identical to the toolholder body 330 presented in FIGS. 5 and 6 with the exception that the toolholder body 330 now further includes longitudinally extending slots 350 which extend rearwardly from the forwardly facing surface 340 of the toolholder body 330. As illustrated in FIG. 5 the slots 350 are positioned symmetrically about the toolholder bore central axis 315.

The cutting insert body 425, on the other hand, includes longitudinally extending projections 450 which are positioned symmetrically about the central axis 405 of the insert tapered shank.

The purpose of this arrangement is two-fold. First of all, the slots 350 in the toolholder body 330 provide greater flexibility for expansion of the tapered section 345 of the bore 335. Additionally, by engaging the projections 450 of the cutting insert body 425 within the slots 350 of the toolholder body 330, the cutting insert body 425 is positively restrained to prevent rotation of the cutting insert 400 within the toolholder 325.

It is possible to secure a cutting insert having features similar to that cutting insert 100 found in FIG. 4, in particular having no projection 450 (FIG. 5), within a toolholder body 330 having slots 350 similar to that shown in FIG. 5. This may be especially beneficial for small diameter cutting inserts wherein the diameter in the region of the forwardly facing surface 340 may not be sufficient to allow the strain of resilient expansion caused by insertion of the shank 415 within the bore 335. Returning attention to FIG. 4, it is also possible for the shank 115 of the cutting insert body 125 to have longitudinally extending slots therein which would engage longitudinally extending projections within the bore 35 of the toolholder body 30. Furthermore, it is possible to have projections extending from either the forwardly facing surface 40 of the toolholder body 30 or the rearwardly facing face 120 of the cutting insert body 125 to engage mating recesses in the other of the forwardly facing surface 40 or the rearwardly facing face 120.

Directing attention to FIG. 6, in a manner similar to that illustrated in FIG. 4, a hold-down bolt 500 may be used to retain the cutting insert body 425 within the toolholder body 330. Furthermore, the knockout screw 510 (illustrated in phantom) may also be utilized as a mechanism for displacing the cutting insert body 425 from the toolholder body 330 when removal of the cutting insert body 425 is desired.

The use of the design in accordance with the subject invention provides an arrangement to seat the insert 100 upon the toolholder 25 with good concentricity and to prevent relative rotation between the insert 100 and the toolholder 25. Furthermore, this arrangement allows the use of a hold-down bolt 200 which must have adequate strength only to properly seat and to hold the insert 100. This is unlike prior art arrangements whereby the hold-down bolt was required to be sufficiently strong to retain the insert within the toolholder against the cutting forces which tended to displace or expel a cutting insert from a toolholder.

Figure 7A:
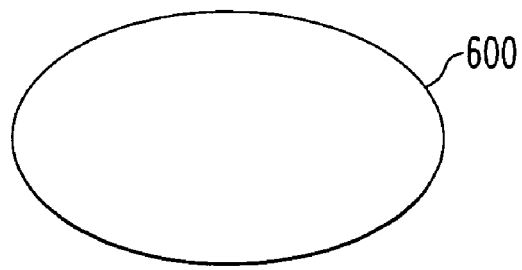
FIG. 7A is a top view of the toolholder bore/insert shank showing an oval shape.
Figure 7B:
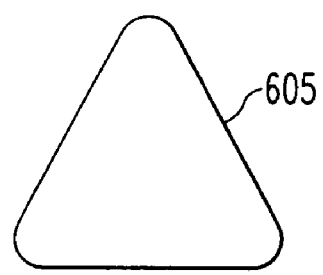
FIG. 7B is a top view of the toolholder bore/insert shank showing a triangular shape.
Figure 7C:
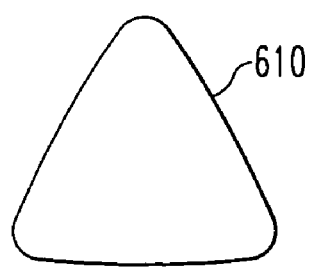
FIG. 7C is a top view of the toolholder bore/insert shank showing a lobed triangular shape.

Although what has so far been discussed are conical tapered sections, for example the tapered section 45 within the bore 35 of the toolholder 25 and the tapered shank 115 of the cutting insert 100, it is entirely possible for the tapered section of the toolholder and the tapered shank of the cutting insert to have a non-circular shape such as oval 600, as illustrated in FIG. 7A, in as much as this shape is still tapered and provides a resilient interference fit between the tapered section of the bore and the tapered shank of the insert. It is furthermore possible that the tapered section of the bore and the tapered shank each have a matching polygonal shape such as, for example, the shape of a triangle 605 (FIG. 7B) or of a lobed triangle 610 (FIG. 7C).

The cutting insert 100 is illustrated with a circular cutting edge 135. It should be appreciated that the shape of the cutting edge can be any shape that may be supported by the shank 115, which itself is not limited to a conical shape.

It should further be noted that the toolholder assembly described so far may be used for a rotating toolholder or a static toolholder. In the event the application is directed to a rotating toolholder and cutting insert, then directing attention to FIG. 5, the symmetry of the slots 350 and the projections 450 about the central axes 405, 315 become important since the toolholder assembly 305 should be balanced for rotating applications. However, in the event that toolholder assembly 305 is subjected only to static applications, then it is possible to include a single projection 450 or another arrangement of asymmetric projections which engage one or more of the slots 350 in the toolholder body 330. It should be noted that, in order to maintain concentricity and a uniform holding force upon the cutting insert body 425, the slots 350 in the toolholder body 330 illustrated in FIG. 5 should continue to be symmetric.

Returning attention to FIG. 4, the cutting insert 100 may be mounted within the toolholder body 30 in the following manner. The knockout screw 210 is threadably secured within the passageway 220. The cutting insert 100 is then placed within the bore 35 and the hold-down bolt 200 is rotated such that it engages the threads 225 within the knockout screw 210. The hold-down bolt 200 is tightened until the cutting insert 100 is fully seated within the toolholder 25 and in particular, until the rearwardly facing face 120 of the cutting insert 100 is in full abutment with the forwardly facing surface 40 of the toolholder 25. At this point the toolholder assembly 5 is suitable for use. To remove the cutting insert 100 from the toolholder 25, the hold-down bolt 200 is loosened, a tool is inserted within the end 230 of the knockout screw 210 and rotated such that the knockout screw 210 is urged axially to the right, with respect to FIG. 4, and against the cutting insert 100. Since the diameter of the passageway 140 extending through the insert 100 is greater than that of the hold-down bolt 200, the hold-down bolt 200 may rotate relative to the cutting insert body 125. Rotation of the knockout screw 210 results in axial motion to the right and subsequent displacement of the insert 100 from the toolholder 25.

The subject invention is furthermore directed to a method of releasably mounting a cutting insert 100 into a toolholder 25 as discussed herein and comprise the steps of inserting the insert 100 into the toolholder bore 35, resiliently interference fitting the tapered shank 115 into the toolholder bore 35 and abutting the rearwardly facing face 120 of the insert 100 against the forwardly facing surface 40 of the toolholder 25.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A toolholder adapted to accept a cutting insert having a forward end, a tapered shank and a rearwardly facing face thereon with a passageway extending completely through the insert, wherein the toolholder comprises:
   a) a toolholder body;
   b) a bore extending rearwardly therein and having a central axis extending therethrough;
   c) a forwardly facing surface extending about the bore for abutment with the rearwardly facing face of the insert;
   d) wherein the bore has a tapered section which narrows inwardly as it extends from the forwardly facing surface and is dimensioned to radially expand and to provide a resilient interference fit with the shank when the forwardly facing surface is in abutment with the rearwardly facing face, and wherein the tapered section of the bore has one of the shapes from the group of shapes consisting of a circle, ellipse, triangle and lobed triangle;
   e) a toolholder passageway extending beyond the bore and through the toolholder body along the central axis;
   f) a hold-down bolt engageable within the toolholder passageway, wherein the hold down bolt has a head larger than the insert passageway and a hold down bolt shank smaller than the insert passageway and the bolt head engages the forward end of and retains the cutting insert within the toolholder, and wherein the hold-down bolt is not part of the cutting insert; and
   g) wherein the tapered section of the bore includes longitudinally extending slots extending rearwardly from the forwardly facing surface of the toolholder adapted to receive matching projections extending from the cutting insert.

2. The toolholder according to claim 1, wherein walls of the tapered section form a taper angle of between 5 degrees and 15 degrees with the central axis.

3. The toolholder according to claim 2, wherein the taper angle is approximately 10 degrees.

4. The toolholder according to claim 1, wherein the tapered section has the shape of a circle and wherein the tapered bore has a conical shape.

5. The toolholder according to claim 1, wherein the tapered bore has a non-circular shape.

6. The toolholder according to claim 1, wherein the tapered bore has the shape of a triangle or a lobed triangle.

7. The toolholder according to claim 1, wherein the tapered section of the bore has the shape of a circle or an ellipse and further including longitudinally extending slots extending rearwardly from the forwardly facing surface of the toolholder.

8. The toolholder according to claim 7, wherein the slots are positioned symmetrically about the toolholder central axis.

9. The toolholder according to claim 1, wherein the forwardly facing surface is conical and forms a cone angle with the central axis of between 80 degrees and 100 degrees.

10. The toolholder according to claim 1, wherein the forwardly facing surface is perpendicular to the central axis of the bore.

11. The toolholder according to claim 1, wherein the bore is accessible from the rearward end of the toolholder to permit displacement and removal of a cutting insert mounted therein.

12. The toolholder according to claim 1, further including a knock-out screw secured within the passageway, wherein the hold-down bolt is secured within a bore extending through the knock-out screw, such that an insert secured within the toolholder body may be pushed from and thereby ejected from the toolholder body by the knock-out screw.

13. A cutting insert adapted to be mounted within a toolholder having a bore extending rearwardly therein and a forwardly facing surface thereon, wherein the insert comprises a cutting insert body having:
   a) a forward end with a cutting edge thereupon, wherein the cutting edge is defined about the periphery of the cutting insert body within a plane at the forward end, wherein the plane is oriented perpendicular to the central axis, and wherein the cutting edge is continuous about the periphery;
   b) a shank receivable in the bore, extending rearwardly from the forward end, and having a central axis extending therethrough;
   c) a rearwardly facing face between the forward end of the insert body and the shank of the insert body for abutment with the forwardly facing surface of the toolholder;
   d) wherein the shank has a tapered section dimensioned to radially expand and to provide a resilient interference fit with the bore when the rearwardly facing face of the insert body is in abutment with the forwardly facing surface of the toolholder, wherein the tapered shank narrows as it extends rearwardly, and wherein the shank has one of the shapes from the group of shapes consisting of a circle, ellipse, triangle and lobed triangle; and
   e) a passageway extending completely through the insert body along the central axis to accommodate a hold-down bolt extending through the insert forward end for securing the cutting insert within the toolholder.

14. The insert according to claim 13, wherein walls of the shank form a taper angle of between 5 degrees and 15 degrees with the central axis.

15. The insert according to claim 14, wherein the shank taper angle is preferably 10 degrees.

16. The insert according to claim 14, wherein the tapered section has the shape of a circle and wherein the shank has a conical shape.

17. The insert according to claim 14, wherein the shank has a non-circular shape.

18. The insert according to claim 14, wherein the shank has the shape of a triangle or lobed triangle.

19. The insert according to claim 14, wherein the tapered section of the bore has the shape of a circle or an ellipse and further including longitudinally extending projections extending rearwardly from the rearwardly facing face of the insert to engage matching slots in the toolholder.

20. The insert according to claim 19, wherein the projections are positioned symmetrically about the insert central axis.

21. The insert according to claim 14, wherein the rearwardly facing face is conical and forms a cone angle with the central axis of between 80 degrees and 100 degrees.

22. The insert according to claim 14, wherein the rearwardly facing face is perpendicular to the insert shank central axis.

23. The cutting insert according to claim 13, wherein the periphery is circular.

24. A cutting insert adapted to be mounted within a toolholder having a bore extending rearwardly therein and a forwardly facing surface extending about the bore, wherein the insert comprises a cutting insert body having:
   a) a forward end with a cutting edge thereupon, wherein the cutting edge is defined about the periphery of the cutting insert body within a plane at the forward end, wherein the plane is oriented perpendicular to the central axis, and wherein the cutting edge is continuous about the periphery;
   b) a shank receivable in the bore, extending rearwardly from a forward end of the insert body, and having a central axis extending therethrough, wherein the shank has a conical section that is tapered and narrows as the shank extends rearwardly, and wherein the shank has one of the shapes from the group of shapes consisting of a circle, ellipse, triangle and lobed triangle;
   c) a rearwardly facing face generally perpendicular to the central axis and located between the forward end of the insert body and the shank of the insert body; and
   d) a passageway extending completely through the insert body along the central axis to accommodate a hold-down bolt extending through the insert forward end for securing the cutting insert within the toolholder.

25. A toolholder system comprising:
   a) a toolholder body having:
      1) a toolholder bore extending rearwardly therein and having a central axis extending therethrough;
      2) a forwardly facing surface extending about the bore; and
      3) a passageway extending beyond the bore and through the toolholder body along the central axis;
   b) a cutting insert body having:
      1) a forward end with a cutting edge thereupon, wherein the cutting edge is defined about the periphery of the cutting insert body within a plane at the forward end, wherein the plane is oriented perpendicular to the central axis, and wherein the cutting edge is continuous about the periphery;
      2) an insert shank extending rearwardly from the forward end and having a central axis extending therethrough;
      3) a rearwardly facing face between the forward end of the insert and the shank of the insert; and
      4) a passageway extending completely through the insert body along the central axis extending through the insert forward end for securing the cutting insert within the toolholder;
   c) wherein the forwardly facing surface of the toolholder is in contact with the rearwardly facing face of the insert;
   d) wherein the toolholder bore has a tapered section and the shank has a slightly mismatched taper, wherein each is dimensioned to radially expand and to provide a resilient interference fit with each other when the forwardly facing surface of the toolholder is in abutment with the rearwardly facing face of the insert, wherein the tapered section of the bore has one of the shapes from the group of shapes consisting of a circle, ellipse, triangle and lobed triangle, and wherein the shank has the same one of the shapes of a polygon from the group of shapes consisting of a circle, ellipse, triangle and lobed triangle; and
   e) a hold-down bolt extending through the insert passageway within the cutting insert and engaging with the toolholder passageway within the toolholder to retain the cutting insert mounted within the toolholder, wherein the hold down bolt has a head larger than the insert passageway and a hold down bolt shank smaller than the insert passageway such that the hold down bolt engages the forward end and retains the cutting insert within the toolholder.

26. The toolholder system according to claim 25, wherein the toolholder bore taper forms a bore taper angle with the central axis, the tapered shank forms a shank taper angle with the central axis, and wherein the bore taper angle and the shank taper angle differ by up to 3 degrees.

27. The toolholder system according to claim 26, wherein the bore taper angle and the shank taper angle differ by up to 1.0 degree.

28. The toolholder system according to claim 25, wherein the toolholder bore forms a taper angle of 9.5 degrees with the central axis and the tapered shank forms a shank taper angle of 10 degrees with the central axis.

29. The toolholder system according to claim 25, wherein the tapered section of the bore has the shape of a circle or an ellipse and, wherein the cutting insert body has at least one longitudinally extending slot therein and the bore of the toolholder body has at least one longitudinally extending projection extending therefrom and, wherein the at least one projection engage the at least one slot, wherein the at least one projection engage the at least one slot.

30. The toolholder system according to claim 25, wherein at least one projection extends from one of the forwardly facing surface of the toolholder body or the rearwardly facing face of the insert body and at least one mating recess extends into the other of the forwardly facing surface of the toolholder body or the rearwardly facing face of the insert body and wherein the at least one projection engages the at least one slot.

31. A method of releasably mounting a cutting insert onto a toolholder having a bore extending rearwardly therein and a forwardly facing surface extending about the bore, wherein the insert has a forward end, a shank extending rearwardly therefrom, and a rearwardly facing face, wherein the shank has a taper narrowing away from the forward end and, wherein the tapered section of the bore includes longitudinally extending slots extending rearwardly from the forwardly facing surface of the toolholder adapted to receive matching projections extending from the cutting insert, the method comprising the steps of:
   a) inserting the insert into the toolholder bore;
   b) resiliently interference fitting the tapered shank into the toolholder bore to cause radial expansion of the toolholder; and
   c) securing a hold-down bolt by extending the hold-down bolt shank completely through the cutting insert and into the toolholder passageway to force the shank of the cutting insert into the toolholder bore so until the rearwardly facing face of the insert abuts against the forwardly facing surface of the toolholder, wherein the hold-down bolt has a head larger than the insert passageway and a hold-down bolt shank smaller than the insert passageway such that the hold down bolt engages the forward end of the insert and retains the cutting insert within the toolholder.

32. A cutting insert adapted to be mounted within a toolholder having a bore extending rearwardly therein and a forwardly facing surface thereon, wherein the insert comprises:
- a) a cutting insert body having a forward end with a cutting edge thereupon, wherein the cutting edge is defined about the periphery of the cutting insert body within a plane at the forward end, wherein the plane is oriented perpendicular to the central axis and, wherein the cutting edge is continuous about the periphery;
- b) a shank receivable in the bore, extending rearwardly from the forward end, and having a central axis extending therethrough;
- c) a rearwardly facing face between the forward end of the insert body and the shank of the insert body for abutment with the forwardly facing surface of the toolholder;
- d) wherein the shank has a tapered section dimensioned to provide a resilient interference fit with the bore when the rearwardly facing face of the insert body is in abutment with the forwardly facing surface of the toolholder, and wherein the tapered shank narrows as it extends rearwardly;
- e) a passageway extending completely through the insert body along the central axis to accommodate a hold-down bolt extending the insert forward end for securing the cutting insert within the toolholder; and
- f) wherein the cutting edge extends around the perimeter of the cutting insert body, is spaced apart from, and is separate from the shank.

33. A cutting insert adapted to be mounted within a toolholder having a bore extending rearwardly therein and a forwardly facing surface thereon, wherein the insert comprises a cutting insert body having:
- a) a forward end with a cutting edge thereupon, wherein the cutting edge is defined about the periphery of the cutting insert body within a plane at the forward end, wherein the plane is oriented perpendicular to the central axis, wherein the cutting insert has a wall extending rearwardly from the cutting edge and, wherein the wall tapers inwardly as the wall extends from the forward end;
- b) a shank receivable in the bore, extending rearwardly from the forward end, and having a central axis extending therethrough;
- c) a rearwardly facing face between the forward end of the insert body and the shank of the insert body for abutment with the forwardly facing surface of the toolholder;
- d) wherein the shank has a tapered section dimensioned to radially expand and to provide a resilient interference fit with the bore when the rearwardly facing face of the insert body is in abutment with the forwardly facing surface of the toolholder, wherein the tapered shank narrows as it extends rearwardly and, wherein the shank has one of the shapes of a polygon from the group of shapes consisting of a circle, ellipse, triangle and lobed triangle; and
- e) a passageway extending through the insert body along the central axis to accommodate a hold-down bolt for securing the cutting insert within the toolholder.

\* \* \* \* \*